May 4, 1965  L. C. H. JUY  3,181,390
CONTROL LEVER DEVICES
Filed March 19, 1963
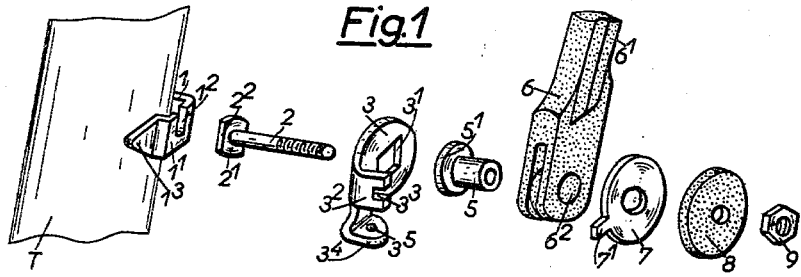
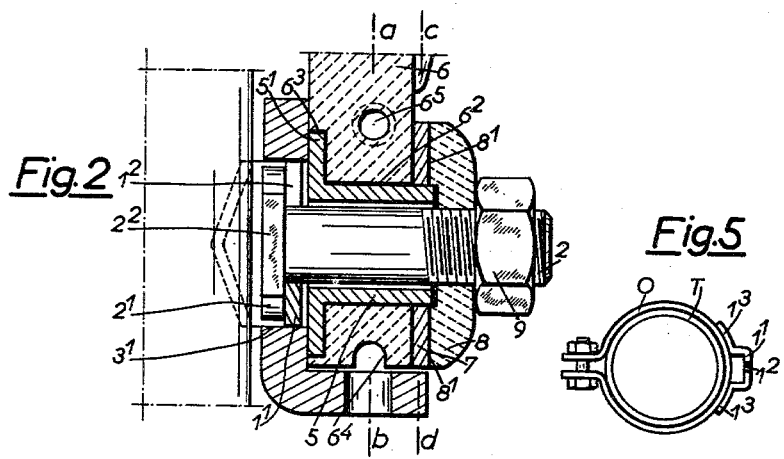
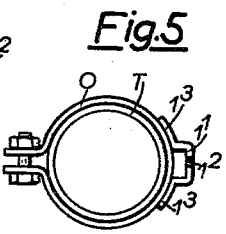
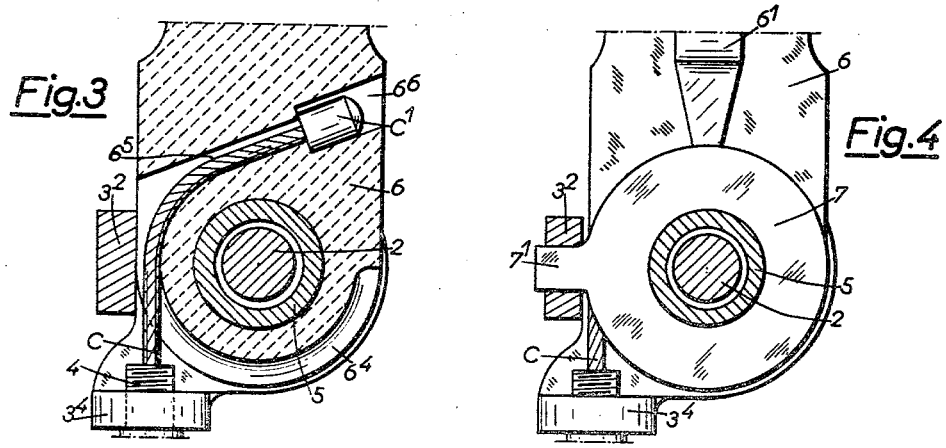

United States Patent Office 3,181,390
Patented May 4, 1965

3,181,390
CONTROL LEVER DEVICES
Lucien C. H. Juy, 75 Rue General Fauconnet,
Dijon, Cote d'Or, France
Filed Mar. 19, 1963, Ser. No. 266,382
Claims priority, application France, Apr. 20, 1962,
8,426
6 Claims. (Cl. 74—531)

This invention relates to control lever devices for bicycles, tandems, motorized bicycles, motor bicycles and similar vehicles.

It is an object of the invention to provide improvements in control lever devices of the above type.

According to the present invention there is provided a control lever device for use on a bicycle or like vehicle, comprising a bracket for connection to a frame member of the vehicle, a pivot member carried by and extending from said bracket, a control lever formed of a synthetic plastic material and mounted for pivotal movement about said pivot member, and securing means including parts formed respectively of metal and of resilient synthetic plastic material for adjustably securing said lever on said pivot member.

For a better understanding of the invention and to show how the same may be carried into effect reference is now made, by way of example, to the accompanying drawing in which:

FIGURE 1 is an exploded perspective view illustrating the elements constituting a control lever device, the elements being arranged in axial alignment in order of assembly, FIGURE 2 is a sectional view, drawn to a larger scale, illustrating the control lever device mounted on a metal base, FIGURE 3 is a cross-sectional view taken along the line a–b of FIGURE 2, FIGURE 4 is a cross-sectional view taken along the line c–d of FIGURE 2, and FIGURE 5 is a plan view, drawn to a smaller scale, illustrating the securing of the metal base on a fitted collar.

Referring to the drawing, FIGURE 1 shows a control lever device having a bracket 1 which is formed with lugs $1^3$ arranged to be secured to the frame T of a vehicle by brazing or like means. The bracket 1, which is manufactured by stamping is shaped in such a manner as to provide a protruding portion $1^1$ which is spaced from the frame T. The protruding portion $1^1$ of the bracket 1 is of polygonal section (square in the example illustrated) and is formed with an open slot $1^2$ which is arranged to receive an enlarged head $2^1$ of a pivot member 2 in such a manner that the shank of the pivot member 2 is held substantially perpendicularly with respect to the longitudinal axis of the frame T. The head $2^1$ of the pivot member 2 is formed with diametrically opposed flats $2^2$ which engage the inner surface of the protruding portion $1^1$ of the bracket 1 in such a manner as to prevent rotation of the pivot member 2 when inserted in the slot $1^2$.

A metal support washer 3 having a tongue $3^2$ which is bent substantially parallel to the bolt 2 is formed with an axially extending aperture $3^1$ having substantially the same shape as the external configuration of the protruding portion $1^1$ of the bracket 1 so that the support washer 3 may be fitted over the protruding portion $1^1$ in such a manner that rotation of the washer 3 relative to the base member 1 is prevented. The support washer 3 is further provided with a lug $3^4$ which extends below the tongue $3^2$ in a plane substantially perpendicular to the plane of the tongue $3^2$. The tongue $3^2$ is formed with an open transverse slot $3^3$ and the lug $3^4$ is formed with an internally screw-threaded bore $3^5$ for the reception of a hollow screw 4 serving as a guide for the control cable C of a change speed gear.

A bush 5 is rotatably mounted on the bolt 2 and has a flanged portion $5^1$ which is arranged to abut against the support washer 3 and the protruding portion $1^1$ of the bracket 1. A gear change lever 6, formed with a hole $6^2$ whose diameter is substantially the same as the outer diameter of the bush 5, is mounted on the bush 5 as a pressfit, the flange $5^1$ fitting into a counter-bored or recessed portion $6^3$ (see FIGURE 2) formed on one of the shoulders of the lever 6. The lever 6 is constituted of a plastic material. The plastic control lever 6 has a rounded flat section at its base and its upper portion forms a profiled lever having a reinforcing rib $6^1$. The end of the bush 5 remote from the flange $5^1$ projects beyond the lever 6 and this projecting portion is arranged to receive a washer 7 having a radial finger $7^1$ formed on its periphery. The finger $7^1$ is arranged to engage in the slot $3^3$ of the tongue $3^2$ and thus is held against rotational movement about the pivot member 2. A further washer 8 having an axially extending annular portion $8^1$ and a bore which is substantially the same diameter as the shank of the pivot member 2 is arranged in such a manner that the raised portion $8^1$ abuts the washer 7. The whole assembly is held together by means of a nut 9 which may be of synthetic plastic material or metal and which is screwed onto a screw-threaded portion of the pivot member 2. By tightening or loosening the nut 9, the friction adjustment of the control lever 6 by transverse gripping can be varied. This will provide a desired frictional control for the freedom of pivoting movement of the lever 6 on the bush 5.

Referring now to FIGURE 3 it will be seen that the lever 6 is formed with a groove $6^4$ which extends partially around the hole $6^2$. This groove $6^4$ communicates with a passageway $6^5$ which extends tangentially to the groove $6^4$ and continues through the lever 6 opening into an aperture $6^6$ which has a greater diameter than the passageway $6^5$. This aperture $6^6$ is arranged to receive a cable head $C^1$ to which is attached the cable C, which latter is arranged to pass through the passageway $6^5$ and be guided by the groove $6^4$ through the hollow screw 4 in the bore $3^5$ of the lug $3^4$ formed on the support washer 3.

In this way angular movement of the lever 6 will cause the cable C to be wound onto or released from the groove $6^4$ thus increasing or decreasing the effective length of the cable.

An alternative arrangement for securing the bracket 1 to the frame T is shown in FIGURE 5. Here the bracket 1 is brased onto a split collar O having two radially extending portions in each of which there is formed a hole, said holes being aligned and arranged to receive a screw-threaded bolt in such a manner that a nut screwed onto the bolt will decrease the diameter of the collar O and thus enable the collar O to be secured firmly around the frame T.

According to the present invention the lever 6 and the washer 8 are to be made entirely of a synthetic plastic material or are to have the parts thereof which engage with the other elements of the arrangement coated with a synthetic plastic material. The lever 6 may have a reinforcing rib $6^1$ which is metallic.

Due to the fact that the lever 6 is made of a synthetic plastic or has synthetic plastic coated bearing surfaces it will be resiliently arrested due to the intrinsic elasticity and to the resilience imparted by the plastic material.

At its opposite end the cable C may be coupled to a change speed gear or to any other part, for example, a brake, or chain shift device of a bicycle.

With a device as hereinbefore described there is:
(1) A diminution in the risk of corrosion by the elimination of metal elements,
(2) A reduction in weight,
(3) Silent operation,
(4) A more gentle manipulation and less chance of wear.

It is to be understood from what has been stated above that the invention is in no way limited to the embodiments herein described and on the contrary covers all variants.

The synthetic plastic material to be employed in the above described device may be an acetal polymer such as for instance a homopolymer acetal resin.

I claim:
1. A control lever device for use on bicycles and like vehicles, comprising a bracket adapted for connection to a frame member of the vehicle, a pivot member carried by and extending from said bracket, a control lever constituted of synthetic plastic material and mounted for pivotal movement with respect to said pivot member, and securing means adjustably securing said lever on said pivot member, said bracket including lugs for attachment to said frame member of said vehicle and a polygonal protruding portion defining a recess, said pivot member including an enlarged head slidably engaged in said recess, said protruding portion of said bracket having a slot, said pivot member extending from said bracket through said slot in said protruding portion, the enlarged head being shaped to cooperate with the polygonal protruding portion to restrain rotation of said pivot member, said securing means including a metal support washer having an aperture in which the protruding polygonal portion of the bracket is engaged to support and restrain said support washer from rotation, a metal bush rotatably mounted on said pivot member, said control lever having a transverse bore for receiving said bush, said bush supporting the control lever for pivotal movement about said pivot member, the bush including at one end a flange which bears axially against said support washer and including at the opposite end a portion protruding axially beyond said lever, an intermediate washer mounted on the latter said portion of the bush concentric with said pivot member, said securing means further including means urging the intermediate washer axially against said lever in adjustable fashion to provide a desired frictional control in the freedom of pivoting movement of said lever with respect to said pivot member.

2. A device as claimed in claim 1, wherein the pivot member includes a threaded portion, the means urging the intermediate washer axially against the lever comprising a resilient washer of synthetic plastic material and a nut screwed onto the threaded portion of the pivot member, and bearing against the resilient washer for causing the latter to apply axial pressure to the lever via the intermediate washer.

3. A device as claimed in claim 2, wherein the resilient washer includes an axially extending peripheral portion for centering said resilient washer on the protruding end of said metal bush, said axially extending peripheral portion having an annular bearing face which engages the intermediate washer, a radial finger on said intermediate washer engaged with said support washer to prevent rotation of said intermediate washer.

4. A device as claimed in claim 3, wherein said bracket is secured to a collar for embracing and being securely clamped to a frame member of the vehicle.

5. A device as claimed in claim 4, wherein said control lever has a groove, an intermediate passageway and an aperture, said groove extending partially around said transverse bore in said control lever and communicating with said intermediate passageway which in turn opens out into said aperture, a cable with head portion mounted in said control lever, said aperture accommodating the head portion of the cable, the cable extending through the intermediate passageway and around said groove.

6. A device as claimed in claim 5 wherein said support washer includes a pair of axially projecting portions extending in mutually perpendicular planes, one of said portions having a threaded bore, the other of the portions having a slot, a hollow screw engaged in the threaded bore, said cable extending from the lever through the hollow screw and being guided thereby, said finger of said intermediate washer being engaged in the slot of said support washer to be secured thereby against rotational movement about the pivot member.

References Cited by the Examiner
UNITED STATES PATENTS

| | | | |
|---|---|---|---|
| 1,088,595 | 2/14 | Larkin | 74—531 X |
| 1,337,012 | 4/20 | Goodwin | 248—224 X |
| 2,964,341 | 12/60 | Doyle et al. | 287—101 |

BROUGHTON G. DURHAM, *Primary Examiner.*

MILTON KAUFMAN, *Examiner.*